(12) United States Patent
Hu et al.

(10) Patent No.: US 9,385,632 B2
(45) Date of Patent: Jul. 5, 2016

(54) MULTI-LEVEL INVERTER AND POWER SUPPLY SYSTEM

(71) Applicant: Huawei Technologies Co., Ltd., Shenzhen (CN)

(72) Inventors: Yanshen Hu, Shenzhen (CN); Grover Victor Torrico-Bascopé, Kista (SE); Dianbo Fu, Plano, TX (US); Yunfeng Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 14/555,808

(22) Filed: Nov. 28, 2014

(65) Prior Publication Data

US 2015/0085541 A1 Mar. 26, 2015

Related U.S. Application Data

(63) Continuation of application No. PCT/CN2014/070419, filed on Jan. 9, 2014.

(30) Foreign Application Priority Data

Jul. 5, 2013 (CN) .......................... 2013 1 0282002

(51) Int. Cl.
*H02M 7/5387* (2007.01)
*H02M 7/5395* (2006.01)
(Continued)

(52) U.S. Cl.
CPC ............ *H02M 7/5395* (2013.01); *H02M 7/487* (2013.01); *H02M 7/49* (2013.01); *H02M 1/12* (2013.01); *H02M 2001/007* (2013.01); *H02M 2001/0064* (2013.01)

(58) Field of Classification Search
CPC .................................................. H02M 7/5387
USPC ...................................................... 363/43, 71
See application file for complete search history.

(56) References Cited

U.S. PATENT DOCUMENTS 6,072,707 A * 6/2000 Hochgraf .............. H02M 5/458
363/132
2007/0211501 A1 9/2007 Zargari et al.
(Continued)

FOREIGN PATENT DOCUMENTS

CN 1832323 A 9/2006
CN 1877975 A 12/2006
(Continued)

OTHER PUBLICATIONS

Feng et al., "Coupled-Inductance Three-Level Dual Buck Inverter," Transactions of China Electrotechnical Society, vol. 23, No. 11, pp. 91-95, 108, China Academic Journal Electronic Publishing House, Beijing, China (Nov. 2008).
(Continued)

*Primary Examiner* — Jeffrey Sterrett
(74) *Attorney, Agent, or Firm* — Leydig, Voit & Mayer, Ltd (57) ABSTRACT

A multi-level inverter includes two N-level inverter units with pulse width modulation waves staggered by a phase of 180 degrees, and N is an integer greater than or equal to 3; a direct current power source module, where an output end thereof is connected to input ends of the two N-level inverter units; a transformer, where the transformer includes a primary side and a secondary side, an inductor of the primary side and an inductor of the secondary side are coupled, and one end of the inductor of the primary side and one end of the inductor of the secondary side are connected to output ends of the two N-level inverter units respectively. The two N-level inverter units are reversely coupled, and the other end of the inductor of the primary side and the other end of the inductor of the secondary side are connected.

18 Claims, 6 Drawing Sheets

(51) Int. Cl.
*H02M 7/487* (2007.01)
*H02M 7/49* (2007.01)
*H02M 1/12* (2006.01)
*H02M 1/00* (2006.01)

(56) References Cited

U.S. PATENT DOCUMENTS

| | | | |
|---|---|---|---|
| 2007/0211507 | A1 | 9/2007 | Ilic |
| 2013/0155747 | A1 | 6/2013 | Wang |
| 2015/0062984 | A1* | 3/2015 | Hu .......................... H02M 1/12 363/71 |
| 2015/0085541 | A1* | 3/2015 | Hu .......................... H02M 7/487 363/71 |
| 2015/0270789 | A1* | 9/2015 | Shi .................... H02M 3/33569 363/65 |

FOREIGN PATENT DOCUMENTS

| | | |
|---|---|---|
| CN | 101093964 A | 12/2007 |
| CN | 102594191 A | 7/2012 |
| CN | 102801349 A | 11/2012 |
| CN | 102882409 A | 1/2013 |
| CN | 103107720 A | 5/2013 |
| CN | 103178733 A | 6/2013 |
| CN | 103178741 A | 6/2013 |
| CN | 103346690 A | 10/2013 |
| CN | 103368427 A | 10/2013 |
| DE | 102006010694 A1 | 9/2007 |
| DE | 202010012993 U1 | 2/2012 |
| EP | 2226926 A1 | 9/2010 |
| WO | 2011132206 A1 | 10/2011 |

OTHER PUBLICATIONS

Bascopé et al., "Multi-state Commutation Cells to Increase Current Capacity of Multi-Level Inverters," IEEE 33$^{rd}$ International Telecommunications Energy Conference (INTELEC 2011), Amsterdam, Netherlands, Institute of Electrical and Electronics Engineers, New York, New York (Oct. 9-13, 2011).

Neto et al., "Comparative Evaluation of Three Single-Phase NPC Inverters," 10$^{th}$ IEEE/IAS International Conference on Industry Applications (INDUSCON 2012), Fortaleza, CE, Brazil, Institute of Electrical and Electronics Engineers, New York, New York (Nov. 5-7, 2012).

Cacau et al., "Five-Level T-Type Inverter Based on Multi-State Switching Cell," 10$^{th}$ IEEE/IAS International Conference on Industry Applications (INDUSCON 2012), Fortaleza, CE, Brazil, Institute of Electrical and Electronics Engineers, New York, New York (Nov. 5-7, 2012).

* cited by examiner

MULTI-LEVEL INVERTER AND POWER SUPPLY SYSTEM

CROSS-REFERENCE TO RELATED APPLICATION

This application is a continuation of International Patent Application No. PCT/CN2014/070419, filed on Jan. 9, 2014, which claims priority to Chinese Patent Application No. 201310282002.X, filed on Jul. 5, 2013, both of which are hereby incorporated by reference in their entireties.

TECHNICAL FIELD

The present invention relates to the field of electronics, and in particular, to a multi-level inverter and a power supply system.

BACKGROUND

An inverter is an apparatus for converting a direct current (DC) into an alternating current (AC), that is, an inverter can convert direct current electric energy, such as a cell and a storage battery, into an alternating current, which is generally a sine wave or square wave of 220V and 50 HZ. A multi-level inverter can first convert a direct current into a step-like square wave of multiple levels, and then form a sine wave by using a filter. If there are more levels implemented by the multi-level inverter, a waveform of a sine wave that is obtained by the multi-level inverter by means of conversion is more approximate to a standard sine waveform. In the prior art, a multi-level inverter may include two inverter units, multiple separate inductors or coupled inductors, an output filter capacitor, and multiple power switching devices, where the two inverter units are interleaved and configured to convert a current, that is, to convert a direct current into an alternating current; and the multiple separate inductors or coupled inductors form a filter with the output filter capacitor, to filter an input circuit and provide energy for a load. Generally, multiple levels of an output voltage in the multi-level inverter are implemented by using different combinations of the multiple power switching devices.

However, in the foregoing multi-level inverter, to implement interleaving of the two inverter units, power switching devices need to be connected outside the two inverter units, and therefore, the number of power switching devices is relatively large. For example, to implement a three-level inverter, two or four power switching devices need to be disposed outside the two interleaved inverter units. As a result, a circuit structure is relatively complex.

SUMMARY

Embodiments of the present invention provide a multi-level inverter and a power supply system, which can simplify a circuit structure.

To achieve the foregoing objective, the embodiments of the present invention use the following technical solutions:

According to a first aspect, a multi-level inverter is provided, including:

two N-level inverter units, where the N-level inverter unit is configured to convert a direct current into an alternating current, and pulse width modulation waves of the two N-level inverter units are staggered by a phase of 180 degrees, so that output waveforms of alternating currents generated by the two N-level inverter units are staggered by half a cycle, where N is an integer greater than or equal to 3;

a direct current power source module, configured to generate a direct current, where an output end of the direct current power source module is connected to input ends of the two N-level inverter units, and configured to supply power to the two N-level inverter units;

a transformer, where the transformer includes a primary side and a secondary side, an inductor of the primary side and an inductor of the secondary side are coupled, one end of the inductor of the primary side and one end of the inductor of the secondary side are connected to output ends of the two N-level inverter units respectively, so that the two N-level inverter units are reversely coupled, and the other end of the inductor of the primary side and the other end of the inductor of the secondary side are connected, so as to output W levels at a junction between the inductors, where W=2N−1; and a filter, where one end of the filter is connected to the junction between the two coupled inductors of the transformer, and the other end of the filter is grounded, configured to filter out a voltage ripple at the junction between the two coupled inductors of the transformer.

With reference to the first aspect, in a first possible implementation manner, the two N-level inverter units include a first N-level inverter unit and a second N-level inverter unit; and at least one switching device in the first N-level inverter unit and at least one switching device in the second N-level inverter unit are turned on so that when the first N-level inverter unit, the second N-level inverter unit, the direct current power source module, and the transformer form a loop, the W levels are output at the junction between the two coupled inductors of the transformer.

With reference to the first possible implementation manner, in a second possible implementation manner, the switching device is a diode or a power switch.

With reference to the first aspect and the first possible implementation manner, in a third possible implementation manner, structures of the two N-level inverter units are the same.

With reference to the first aspect and the first possible implementation manner, in a fourth possible implementation manner, each N-level inverter unit is a T-type five-level topology circuit.

With reference to the first aspect and the first possible implementation manner, in a fifth possible implementation manner, each N-level inverter unit is an I-type five-level topology circuit.

With reference to the first aspect and the first possible implementation manner, in a sixth possible implementation manner, each N-level inverter unit is a T-type three-level topology circuit.

With reference to the first aspect and the first possible implementation manner, in a seventh possible implementation manner, each N-level inverter unit is an I-type three-level topology circuit.

With reference to the first aspect and the first to seventh possible implementation manners, in an eighth possible implementation manner, the filter includes: a filter inductor and a filter output filter capacitor, where one end of the filter inductor is connected to the junction between the two coupled inductors of the transformer, the other end of the filter inductor and one end of the output filter capacitor are connected in series, and the other end of the output filter capacitor is grounded.

According to a second aspect, a power supply system is provided, including:

a direct current power source, a load and any multi-level inverter described above, where the multi-level inverter converts a direct current generated by the direct current power source into an alternating current, so as to provide an alternating current for the load.

Embodiments of the present invention provide a multi-level inverter and a power supply system; the multi-level inverter includes: two N-level inverter units, where the N-level inverter unit is configured to convert a direct current into an alternating current, and pulse width modulation waves of the two N-level inverter units are staggered by a phase of 180 degrees, so that output waveforms of alternating currents generated by the two N-level inverter units are staggered by half a cycle, where N is an integer greater than or equal to 3; a direct current power source module, configured to generate a direct current, where an output end of the direct current power source module is connected to input ends of the two N-level inverter units, to supply power to the two N-level inverter units; a transformer, where the transformer includes a primary side and a secondary side, an inductor of the primary side and an inductor of the secondary side are coupled, one end of the inductor of the primary side and one end of the inductor of the secondary side are connected to output ends of the two N-level inverter units respectively, so that the two N-level inverter units are reversely coupled, and the other end of the inductor of the primary side and the other end of the inductor of the secondary side are connected, so as to output W levels at a junction between the inductors, where W=2N−1; and a filter, where one end of the filter is connected to the junction between the two coupled inductors of the transformer, and the other end of the filter is grounded, configured to filter out a voltage ripple at the junction between the two coupled inductors of the transformer. In this way, the coupled inductors of the transformer are used to be connected to the two N-level inverter units respectively, and it is implemented that the output of the two coupled inductors is W levels.

In the present invention, a transformer is used to replace a part of power switching devices located outside inverter units, which reduces the number of power switching devices, and therefore, a circuit structure is simplified.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
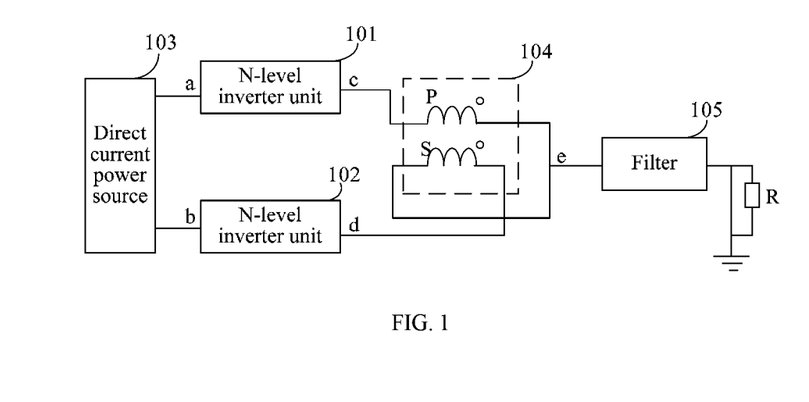
FIG. 1 is a schematic structural diagram of a multi-level inverter according to an embodiment of the present invention.

An embodiment of the present invention provides a multi-level inverter, which, as shown in FIG. 1, includes:

two N-level inverter units 101 and 102, where the N-level inverter unit is configured to convert a direct current into an alternating current, and pulse width modulation waves of the two N-level inverter units 101 and 102 are staggered by a phase of 180 degrees, so that output waveforms of alternating currents generated by the two N-level inverter units are staggered by half a cycle, where N is an integer greater than or equal to 3. In an actual application, a power control chip may be used to control power switching devices of the two N-level inverter units 101 and 102, and generally, pulse width modulation waves may be generated in a control process to turn on or turn off the power switching devices, for example, the power control chip is a PWM (Pulse Width Modulation), and is configured to control the pulse width modulation waves of the two N-level inverter units to be staggered by a phase of 180 degrees in the embodiment of the present invention. Structures of the two N-level inverter units 101 and 102 are the same. The switching device is a diode or a power switch;

a direct current power source module 103, where an output end of the direct current power source module 103 is connected to input ends, that is, point a and point b, of the two N-level inverter units 101 and 102, and configured to supply power to the two N-level inverter units;

a transformer 104, including a primary side and a secondary side, where an inductor P of the primary side and an inductor S of the secondary side are coupled, and one end of the inductor P of the primary side and one end of the inductor S of the secondary side are connected to output ends c and d of the two N-level inverter units respectively, so that the two N-level inverter units 101 and 102 are reversely coupled, and used to implement interleaving of the two N-level inverter units 101 and 102, and the other end of the inductor of the primary side and the other end of the inductor of the secondary side are connected, so as to output W levels at a junction e of the inductors, where the W satisfies that: W=2N−1; and a filter 105, where one end of the filter is connected to the junction e between the two coupled inductors of the transformer, and the other end of the filter is grounded, configured to filter out a voltage ripple at the junction e, that is, the junction between the two coupled inductors of the transformer, and the two coupled inductors are the inductor P of the primary side and the inductor S of the secondary side.

It should be noted that the filter 105 is also connected to a load R, and an output voltage of the filter 105 provides electric energy for the load R.

In this way, the coupled inductors of the transformer are used to be connected to the two N-level inverter units respectively, and it is implemented that the output of the two coupled inductors is W levels. Compared with the prior art, in the present invention, because a transformer is used to replace a part of power switching devices located outside inverter units, which reduces the number of power switching devices, and therefore, a circuit structure is simplified.

Specifically, the two N-level inverter units include a first N-level inverter unit 101 and a second N-level inverter unit 102, where at least one switching device in the first N-level inverter unit 101 and at least one switching device in the second N-level inverter unit 102 are turned on, so that when the first N-level inverter unit 101, the second N-level inverter unit 102, the direct current power source module 103, and the transformer 104 form a loop, the W levels are output at the junction e between the two coupled inductors of the transformer.

Figure 2:
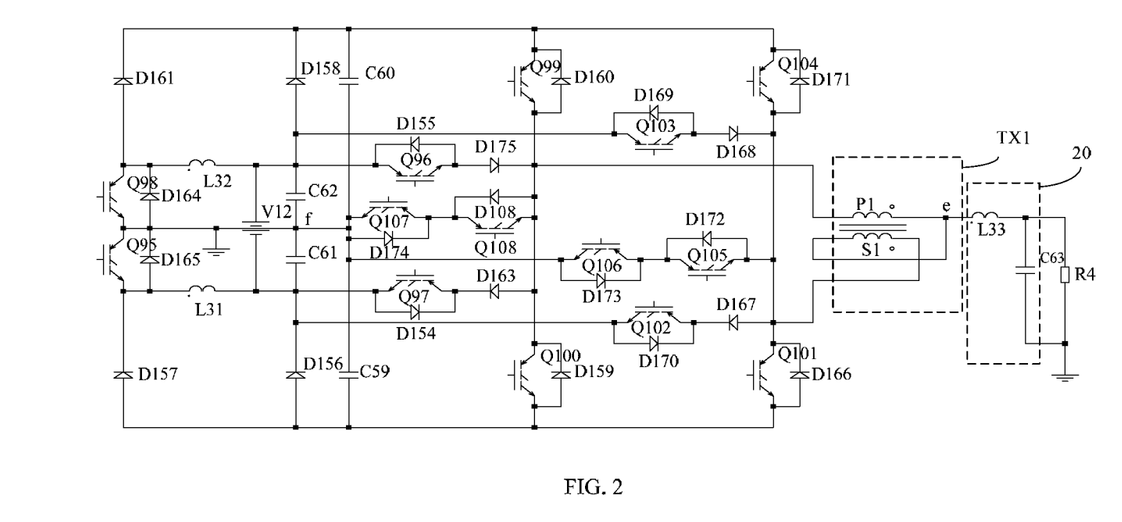
FIG. 2 is a schematic structural diagram of a nine-level inverter according to an embodiment of the present invention.

It should be noted that the N-level inverter unit may use various topology structures. Exemplarily, FIG. 2 is a schematic structural diagram of a nine-level inverter. In the nine-level inverter, each of the N-level inverter units is a T-type five-level topology circuit. The two N-level inverter units are a first T-type five-level inverter unit and a second T-type five-level inverter unit respectively, structures of the two N-level inverter units are the same, and devices at identical locations have identical functions.

In this embodiment, it is assumed that the direct current power source module is a power source V12. The first T-type five-level inverter unit (not shown in FIG. 2) may include: a power switch Q99, a diode D160, a power switch Q100, a diode D159, a power switch Q96, a diode D155, a diode D108, a power switch Q107, a diode D174, a power switch Q108, a diode D175, a power switch Q97, a diode D154, a diode D163, a diode D164, a power switch Q98, an inductor L32, a diode D161, a capacitor C62, a diode D158, and a capacitor C60. The second T-type five-level inverter unit (not shown in FIG. 2) may include: a power switch Q104, a diode D171, a power switch Q101, a diode D166, a power switch Q103, a diode D169, a diode D168, a power switch Q106, a diode D170, a power switch Q105, a diode D172, a power switch Q102, a diode D170, a diode D167, a diode D165, a power switch Q95, a diode D157, an inductor L31, a capacitor C61, a diode D156, and a capacitor C59.

In the second T-type five-level inverter unit, the diode D165 is connected in parallel with the power switch Q95, a negative electrode of the diode D165 is grounded, one end of the inductor L31 is connected to a positive electrode of the diode D165, the other end of the inductor L31 is connected to a negative electrode of the power source V12, a negative electrode of the capacitor C61 is connected to the negative electrode of the power source V12, and a positive electrode of the capacitor C61 is grounded. Meanwhile, the negative electrode of the diode D165 is connected to a negative electrode of the diode D157, the negative electrode of the power source V12 is also connected to a negative electrode of the diode D156, a positive electrode of the diode D157 is connected to a positive electrode of the diode D156, a negative electrode of the capacitor C59 is connected to a junction between the diode D157 and the diode D156, and a positive electrode of the capacitor C59 is grounded. In this embodiment, it is assumed that a voltage of the power source V12 is 2V, an electromotive force of a positive electrode of the power source V12 is +1V, and an electromotive force of a negative electrode of the power source V12 is −1V. In this case, when the power switch Q95 is turned on, the negative electrode of the capacitor C59 is a negative boost (boost) voltage, and can discharge when a circuit forms a loop, and provide a voltage of −2V for the first T-type five-level inverter unit or the second T-type five-level inverter unit. The capacitor C61 can discharge when the circuit forms a loop, and provide a voltage of −1V for the first T-type five-level inverter unit or the second T-type five-level inverter unit. Moreover, when an input end of the first T-type five-level inverter unit or the second T-type five-level inverter unit is connected to a junction f between the capacitors C62 and C61, a voltage of 0V can also be obtained. In this way, five levels, namely, +2V, +1V, 0V, −1V, and −2V, may exist in the first T-type five-level inverter unit or the second T-type five-level inverter unit. It should be noted that, circuit structures of the first T-type five-level inverter unit and the second T-type five-level inverter unit may be adjusted according to a specific situation, for example, the number of capacitors is increased or reduced. A specific structure may be the same as that in the prior art, which is not limited in the present invention.

In an actual application, a PWM controls turning on of corresponding power switches and diodes in the first T-type five-level inverter unit and the second T-type five-level inverter unit by using pulse width modulation waves that are staggered by a phase of 180 degrees, to implement output of W levels at a junction e between two coupled inductors P1 and S1 of a transformer TX1.

Specifically, when the PWM turns on the power switch Q99 of the first T-type five-level inverter unit and the power switch Q101 of the second T-type five-level inverter unit, and turns off other diodes and power switches in the two T-type five-level inverter units, a current passes through the capacitor C60, the power switch Q99, the coupled inductor P1, the coupled inductor S1, the power switch Q101, and the capacitor C59 to form a loop; an electromotive force at the coupled inductor P1 is equal to an electromotive force of a positive electrode of the capacitor C60, that is, +2V, and an electromotive force at the coupled inductor S1 is equal to an electromotive force of the negative electrode of the capacitor C59, that is, −2V. Therefore, an electromotive force at the junction e between the two coupled inductors P1 and S1 is (+2−(−2))/2=+2V, and therefore, a level of +2V is output at the junction e between the two coupled inductors P1 and S1 of the transformer TX1.

When the power switch Q99 of the first T-type five-level inverter unit and the diode D172 and the power switch Q106 of the second T-type five-level inverter unit are turned on, and other diodes and power switches in the two T-type five-level inverter units are turned off, a current passes through the capacitor C60, the power switch Q99, the coupled inductor P1, the coupled inductor S1, the diode D172, and the power switch Q106, and is grounded to form a loop; an electromotive force at the coupled inductor P1 is equal to an electromotive force of a positive electrode of the capacitor C60, that is, +2V, and an electromotive force at the coupled inductor S1 is equal to an electromotive force of the ground, that is, 0V. Therefore, an electromotive force at the junction e between the two coupled inductors P1 and S1 is (+2−0)/2=+1V, and therefore, a level of +1V s output at the junction e between the two coupled inductors P1 and S1 of the transformer TX1.

When the power switch Q99 of the first T-type five-level inverter unit and the diode D167 and the power switch Q102 of the second T-type five-level inverter unit are turned on, and other diodes and power switches in the two T-type five-level inverter units are turned off, a current passes through the capacitor C60, the power switch Q99, the coupled inductor P1, the coupled inductor S1, the diode D172, the power switch Q106, and the capacitor C61 to form a loop; an electromotive force at the coupled inductor P1 is equal to an electromotive force of a positive electrode of the capacitor C60, that is, +2V, and an electromotive force at the coupled inductor S1 is equal to an electromotive force of a negative electrode of the capacitor C61, that is, −1V. Therefore, an electromotive force at the junction e between the two coupled inductors P1 and S1 is (+2−(−1))/2=+3/2V, and therefore, a level of +3/2V is output at the junction e between the two coupled inductors P1 and S1 of the transformer TX1.

When the power switch Q96 and the diode D108 of the first T-type five-level inverter unit and the diode D172 and the power switch Q106 of the second T-type five-level inverter unit are turned on, and other diodes and power switches in the two T-type five-level inverter units are turned off, a current passes through the capacitor C62, the power switch Q96, the diode D108, the coupled inductor P1, the coupled inductor S1, the diode D172, and the power switch Q106, and is grounded to form a loop; an electromotive force at the coupled inductor P1 is equal to an electromotive force of a positive electrode of the capacitor C62, that is, +1V, and an electromotive force at the coupled inductor S1 is equal to an electromotive force of the ground, that is, 0V. Therefore, an electromotive force at the junction e between the two coupled inductors P1 and S1 is (+1−0)/2=+1/2V, and therefore, a level of +1/2V is output at the junction e between the two coupled inductors P1 and S1 of the transformer TX1.

When the power switch Q107 and the power switch Q108 of the first T-type five-level inverter unit and the diode D172 and the power switch Q106 of the second T-type five-level inverter unit are turned on, and other diodes and power switches in the two T-type five-level inverter units are turned off, the coupled inductor P1 is grounded through the power switch Q107 and the power switch Q108, the coupled inductor S1 is grounded through the diode D172 and the power switch Q106; therefore, an electromotive force at the coupled inductor P1 is equal to an electromotive force of the ground, that is, 0V, and an electromotive force at the coupled inductor S1 is equal to an electromotive force of the ground, that is, 0V. Therefore, an electromotive force at the junction e between the two coupled inductors P1 and S1 is 0V. Therefore, a level of 0V is output at an output end of the transformer TX1. Particularly, there may also be multiple methods for implementing the level of 0V. For example, the power switch Q99 of the first T-type five-level inverter unit and the power switch Q104 of the second T-type five-level inverter unit are turned on at the same time, or the power switch Q100 of the first T-type five-level inverter unit and the power switch Q101 of the second T-type five-level inverter unit are turned on at the same time, or the like, which are not described in the present invention again.

When the PWM turns on the power switch Q100 of the first T-type five-level inverter unit and the power switch Q104 of the second T-type five-level inverter unit, and turns off other diodes and power switches in the two T-type five-level inverter units, a current passes through the capacitor C60, the power switch Q104, the coupled inductor S1, the coupled inductor P1, the power switch Q100, and the capacitor C59 to form a loop; an electromotive force at the coupled inductor S1 is equal to an electromotive force of the positive electrode of the capacitor C60, that is, +2V, and an electromotive force at the coupled inductor P1 is equal to an electromotive force of a negative electrode of the capacitor C59, that is, −2V. Therefore, an electromotive force at the junction e between the two coupled inductors P1 and S1 is −(+2−(−2))/2=−2V, and therefore, a level of −2V is output at the junction e between the two coupled inductors P1 and S1 of the transformer TX1.

When the power switch Q104 of the second T-type five-level inverter unit and the diode D168 and the power switch Q107 of the first T-type five-level inverter unit are turned on, and other diodes and power switches in the two T-type five-level inverter units are turned off, a current passes through the capacitor C60, the power switch Q104, the coupled inductor S1, the coupled inductor P1, the diode D168, and the power switch Q107, and is grounded to form a loop; an electromotive force at the coupled inductor S1 is equal to an electromotive force of the positive electrode of the capacitor C60, that is, +2V, and an electromotive force at the coupled inductor P1 is equal to an electromotive force of the ground, that is, 0V. Therefore, an electromotive force at the junction e between the two coupled inductors P1 and S1 is −(+2−0)/2=−1V, and therefore, a level of −1V is output at the junction e between the two coupled inductors P1 and S1 of the transformer TX1.

When the power switch Q104 of the second T-type five-level inverter unit and the diode D163 and the power switch Q97 of the first T-type five-level inverter unit are turned on, and other diodes and power switches in the two T-type five-level inverter units are turned off, a current passes through the capacitor C60, the power switch Q104, the coupled inductor S1, the coupled inductor P1, the diode D163, the power switch Q97, and the capacitor C61 to form a loop; an electromotive force at the coupled inductor S1 is equal to an electromotive force of the positive electrode of the capacitor C60, that is, +2V, and an electromotive force at the coupled inductor P1 is equal to an electromotive force of a negative electrode of the capacitor C61, that is, −1V. Therefore, an electromotive force at the junction e between the two coupled inductors P1 and S1 is −(+2−(−1))/2=−3/2V, and therefore, a level of −3/2V is output at the junction e between the two coupled inductors P1 and S1 of the transformer TX1.

When the power switch Q103 and the diode D168 of the second T-type five-level inverter unit, and the diode D108 and the power switch Q107 of the first T-type five-level inverter unit are turned on, and other diodes and power switches in the two T-type five-level inverter units are turned off, a current passes through the capacitor C62, the power switch Q103, the diode D168, the coupled inductor S1, the coupled inductor P1, the diode D108 and power switch Q107, and is grounded to form a loop; an electromotive force at the coupled inductor S1 is equal to an electromotive force of a positive electrode of the capacitor C62, that is, +1V, and an electromotive force at the coupled inductor P1 is equal to an electromotive force of the ground, that is, 0V. Therefore, an electromotive force at the junction e between the two coupled inductors P1 and S1 is −(+1−0)/2=−1/2V, and therefore, a level of −1/2V is output at the junction e between the two coupled inductors P1 and S1 of the transformer TX1.

In an actual application, the filter may be an LC filter. As shown in FIG. 2, the filter 20 specifically includes: a filter inductor L33 and an output filter capacitor C63, where one end of the inductor L33 is connected to the junction e between the two coupled inductors P1 and S1 of the transformer, the other end of the inductor L33 and one end of the output filter capacitor C63 are connected in series, and the other end of the output filter capacitor C63 is grounded. Moreover, a load R4 is added at two ends of the output filter capacitor C63.

Figure 3:
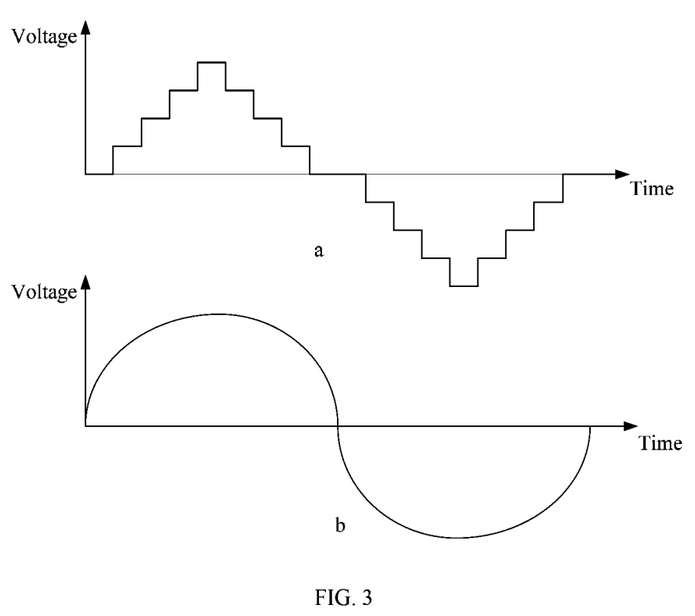
FIG. 3 is a voltage waveform diagram of a nine-level inverter according to an embodiment of the present invention.

In this way, after processing by the two interleaved T-type five-level inverter units and the transformer, at the junction e between the two coupled inductors P1 and S1 of the transformer, a voltage waveform of the direct current power source module V12 is transformed to a step-like waveform as shown in FIG. 3-*a*. Five levels may be implemented in each T-type five-level inverter unit, and therefore, 5×2−1=9 levels are implemented at the output end of the transformer; and then by filtering by the LC filter, a sine wave as shown in FIG. 3-*b* is finally obtained, and is applied on the load R4, where in FIG. 3, a horizontal axis represents time t, and a vertical axis represents voltage v.

Figure 4:
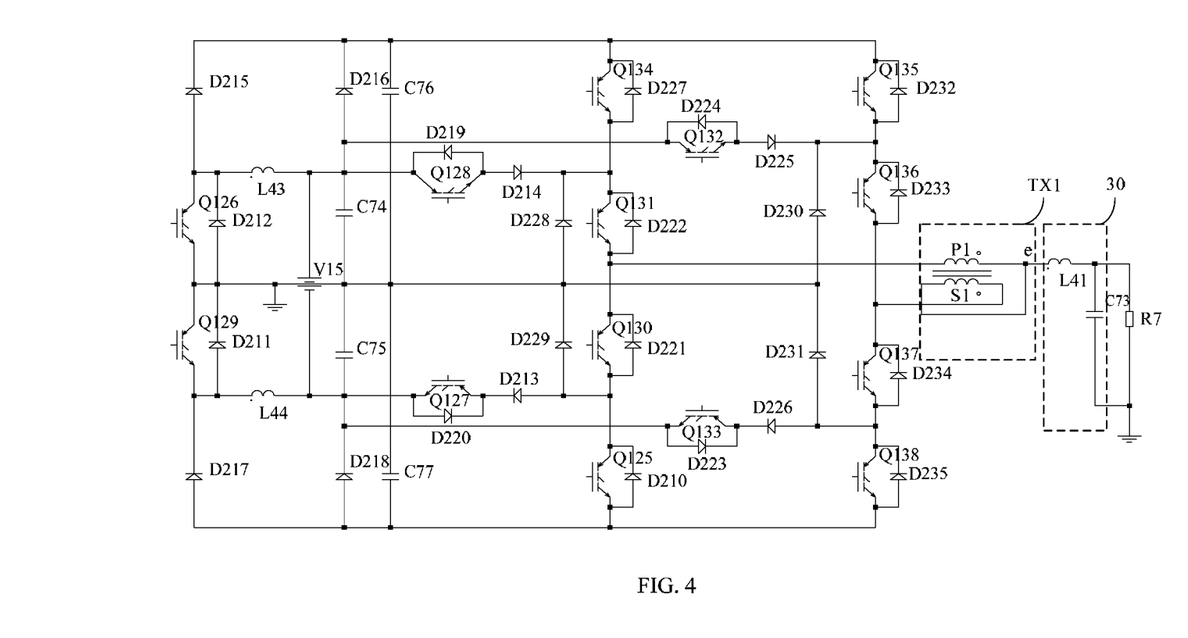
FIG. 4 is a schematic structural diagram of another nine-level inverter according to an embodiment of the present invention.

When the multi-level inverter is a nine-level inverter, and each of the N-level inverter units is an I-type five-level topology circuit, as shown in FIG. 4, two I-type five-level inverter units are a first I-type five-level inverter unit and a second I-type five-level inverter unit respectively, structures of the two I-type five-level inverter units are the same, and devices at identical locations have identical functions. The first I-type five-level inverter unit and second I-type five-level inverter unit are configured to implement conversion from a direct current into an alternating current.

In this embodiment, it is assumed that the direct current power source module is a power source V15. The first I-type five-level inverter unit includes: a power switch Q134, a diode D227, a power switch Q131, a diode D222, a power switch Q130, a diode D221, a power switch Q125, a diode D210, a diode D219, a power switch Q128, a diode D214, a diode D228, a power switch Q127, a diode D220, a diode D213, a diode D212, a power switch Q126, an inductor L43, a diode D215, a capacitor C74, a diode D216, and a capacitor C76. The second I-type five-level inverter unit (not shown in FIG. 4) includes: a power switch Q135, a diode D232, a power switch Q136, a diode D233, a power switch Q137, a diode D234, a power switch Q138, a diode D210, a power switch Q132, a diode D224, a diode D225, a diode D230, a power switch Q133, a diode D223, a diode D231, a diode D226, a diode D211, a power switch Q129, a diode D211, an inductor L44, a capacitor C75, a diode D218, and a capacitor C77.

In this embodiment, it is assumed that a voltage of the power source V15 is 2V, an electromotive force of a positive electrode of the power source V12 is +1V, and an electromotive force of a negative electrode of the power source V12 is −1V. For an operating principle of circuits of t the foregoing two I-type power supply subunits, that is, the first I-type five-level inverter unit and the second I-type five-level inverter unit described above, reference may be made to an operating principle of power supply subunits in the T-type five-level topology circuit in FIG. 3. The two I-type power supply subunits can separately provide five levels, that is, +2V, +1V, 0V, −1V, and −2V, for a first I-type power supply subunit and a second I-type power supply subunit, which is not described in the present invention again.

A PWM controls turning on of corresponding power switches and diodes in the first I-type five-level inverter unit and the second I-type five-level inverter unit by using pulse width modulation waves that are staggered by a phase of 180 degrees, to implement output of W levels at a junction e between two coupled inductors P1 and S1 of a transformer TX1.

A positive half cycle of a sine wave of an output voltage is used as an example. When the PWM turns on the power switch Q134 and the power switch Q131 of the first I-type five-level inverter unit, and the power switch Q137 and the power switch Q138 of the second I-type five-level inverter unit, and turns off other diodes and power switches in the two I-type five-level inverter units, a current passes through the capacitor C76, the power switch Q134, the power switch Q131, the coupled inductor P1, the coupled inductor S1, the power switch Q137, the power switch Q138, and the capacitor C77 to form a loop; an electromotive force at the coupled inductor P1 is equal to an electromotive force of a positive electrode of the capacitor C76, that is, +2V and an electromotive force at the coupled inductor S1 is equal to an electromotive force of a negative electrode of the capacitor C77, that is, −2V. Therefore, an electromotive force at the junction e between the two coupled inductors P1 and S1 is (+2−(−2))/2=+2V, and therefore, a level of +2V is output at the junction e between the two coupled inductors P1 and S1 of the transformer TX1.

When the power switch Q134 and the power switch Q131 of the first I-type five-level inverter unit, and the power switch Q137 and the diode D231 of the second I-type five-level inverter unit are turned on, and other diodes and power switches in the two I-type five-level inverter units are turned off, a current passes through the capacitor C76, the power switch Q134, the power switch Q131, the coupled inductor P1, the coupled inductor S1, the power switch Q137, the diode D231, and is grounded to form a loop; an electromotive force at the coupled inductor P1 is equal to an electromotive force of a positive electrode of the capacitor C76, that is, +2V, and an electromotive force at the coupled inductor S1 is equal to an electromotive force of the ground, that is, 0V. Therefore, an electromotive force at the junction e between the two coupled inductors P1 and S1 is (+2−0)/2=+1V, and therefore, a level of +1V is output at the junction e between the two coupled inductors P1 and S1 of the transformer TX1.

When the power switch Q134 and the power switch Q131 of the first I-type five-level inverter unit, and the power switch Q137, the diode D226, and the power switch Q133 of the second I-type five-level inverter unit are turned on, and other diodes and power switches in the two I-type five-level inverter units are turned off, a current passes through the capacitor C76, the power switch Q134, the power switch Q131, the coupled inductor P1, the coupled inductor S1, the power switch Q137, the diode D226, the power switch Q133, and the capacitor C75 to form a loop; an electromotive force at the coupled inductor P1 is equal to an electromotive force of a positive electrode of the capacitor C76, that is, +2V, and an electromotive force at the coupled inductor S1 is equal to an electromotive force of a negative electrode of the capacitor C75, that is, −1V. Therefore, an electromotive force at the junction e between the two coupled inductors P1 and S1 is (+2−(−1))/2=+3/2V, and therefore, a level of +3/2V is output at the junction e between the two coupled inductors P1 and S1 of the transformer TX1.

When the power switch Q128, the diode D214, and the power switch Q131 of the first I-type five-level inverter unit, and the power switch Q137 and the diode D231 of the second I-type five-level inverter unit are turned on, and other diodes and power switches of the two I-type five-level inverter units are turned off, a current passes through the capacitor C74, the power switch Q128,the diode D214, the power switch Q131, the coupled inductor P1, the coupled inductor S1, the power switch Q137, and the diode D231, and is grounded to form a loop; an electromotive force at the coupled inductor P1 is equal to an electromotive force of a positive electrode of the capacitor C74, that is, +1V, and an electromotive force at the coupled inductor S1 is equal to an electromotive force of the ground, that is, 0V. Therefore, an electromotive force at the junction e between the two coupled inductors P1 and S1 is (+1−0)/2=+1/2V, and therefore, a level of +1/2V is output at the junction e between the two coupled inductors P1 and S1 of the transformer TX1.

When the diode D230 and the power switch Q136 of the first I-type five-level inverter unit, and the diode D137 and the power switch Q231 of the second I-type five-level inverter unit are turned on, and other diodes and power switches in the two I-type five-level inverter units are turned off, the coupled inductor P1 is grounded through the diode D230 and the power switch Q136, and the coupled inductor S1 is grounded through the diode D137 and the power switch Q231; therefore, an electromotive force at the coupled inductor P1 is equal to an electromotive force of the ground, that is, 0V, and an electromotive force at the coupled inductor S1 is equal to an electromotive force of the ground, that is, 0V. Therefore, an electromotive force at the junction e between the two coupled inductors P1 and S1 is 0V, and therefore, a level of 0V is output at an output end of the transformer TX1. Particularly, there may also be multiple methods for implementing the level of 0V. For example, the power switch Q134 and the power switch Q131 of the first I-type five-level inverter unit, and the power switch Q135 and the power switch Q136 of the second I-type five-level inverter unit are turned on at the same time, or the power switch Q130 and the power switch Q125 of the first I-type five-level inverter unit, and the power switch Q234 and the power switch Q235 of the second I-type five-level inverter unit are turned on at the same time, or the like, which are not described in the present invention again.

In an actual application, the filter may be an LC filter. As shown in FIG. 4, the filter 30 specifically includes: an inductor L41 and an output filter capacitor C73, where one end of the inductor L41 is connected to the junction e between the two coupled inductors P1 and S1 of the transformer, the other end of the inductor L41 and one end of the output filter capacitor C73 are connected in series, and the other end of the output filter capacitor C73 is grounded. Meanwhile, a load R7 is added at two ends of the output filter capacitor C73.

In this way, after processing by the two interleaved I-type five-level inverter units and the transformer, at the output end of the transformer, a waveform of the direct current power source module V15 is transformed to a step-like waveform as shown in FIG. 3-a. Five levels may be implemented in each I-type five-level inverter unit, and therefore, 5×2−1=9 levels are implemented at the junction e between the two coupled inductors P1 and S1 of the transformer; and then by filtering by the LC filter, a sine wave as shown in FIG. 3-b is finally obtained, and is applied on the load R4.

Figure 5:
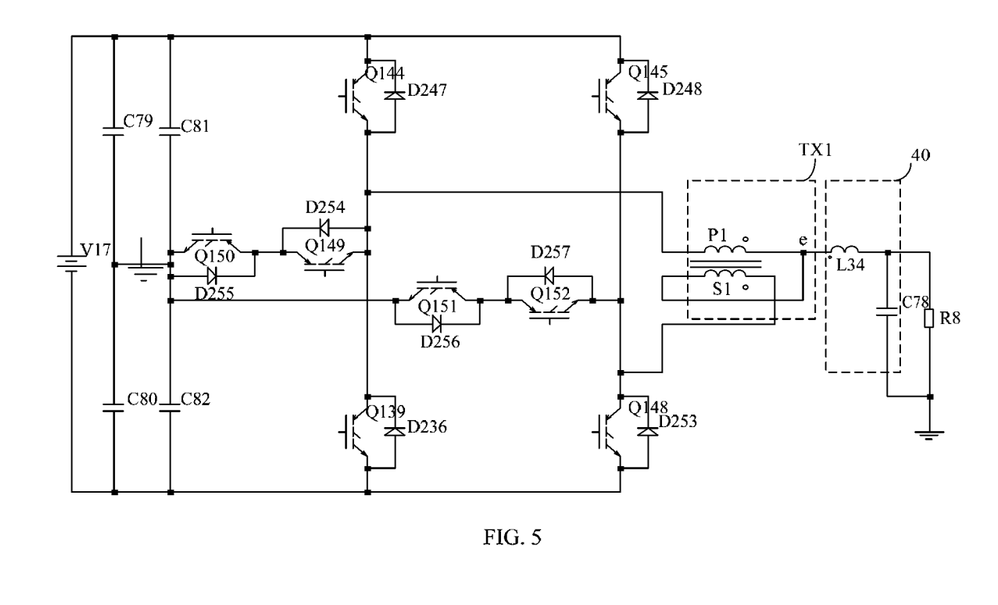
FIG. 5 is a schematic structural diagram of a five-level inverter according to an embodiment of the present invention.

When the multi-level inverter is a five-level inverter, and each of the N-level inverter units is a T-type three-level topology circuit, as shown in FIG. 5, the two N-level inverter units are a first T-type three-level inverter unit and a second T-type three-level inverter unit respectively, structures of the two N-level inverter units are the same, and devices at identical locations have identical functions. The first T-type three-level inverter unit (not shown in FIG. 5) includes: a first power supply subunit and a first T-type three-level inverter unit, and the second T-type three-level inverter unit (not shown in FIG. 5) includes: a second power supply subunit and a second T-type three-level inverter unit, where the first power supply subunit and the second power supply subunit are configured to provide multiple levels for the first T-type three-level inverter unit or the second T-type three-level inverter unit, and the first T-type three-level inverter unit and the second T-type three-level inverter unit are configured to implement conversion from a direct current into an alternating current.

In this embodiment, it is assumed that the direct current power source module is a power source V17. The first T-type three-level inverter unit includes: a power switch Q144, a diode D247, a power switch Q139, a diode D236, a power switch Q150, a diode D255, a power switch Q149, a diode D254, a capacitor C79, and a capacitor C81. The second T-type three-level inverter unit (not shown in FIG. 5) includes: a power switch Q145, a diode D248, a power switch Q148, a diode D253, a power switch Q151, a diode D256, a power switch Q152, a diode D257, a capacitor C80, and a capacitor C82.

In this embodiment, it is assumed that a voltage of the power source V17 is 2V, an electromotive force of a positive electrode of the power source V17 is +1V, and an electromotive force of a negative electrode of the power source V17 is −1V. As can be seen from FIG. 5, the capacitor C79 and the capacitor C80 are connected in series, the capacitor C81 and the capacitor C82 are connected in series, a positive electrode of the capacitor C79 and a positive electrode of the capacitor C81 are connected to the positive electrode of the power source V17, a positive electrode of the capacitor C80 and a negative electrode of the capacitor C82 are connected to the negative electrode of the power source V17, a junction in the middle of the capacitor C79 and the capacitor C80 is grounded, and a junction in the middle of the capacitor C81 and the capacitor C82 is grounded. Therefore, three levels, that is, +1V, 0V, and −1V may be separately provided for the first T-type three-level inverter unit and the second T-type three-level inverter unit. It should be noted that, circuit structures of the first T-type three-level inverter unit and the second T-type three-level inverter unit may be adjusted according to a specific situation, for example, the number of capacitors is increased or reduced. For details, reference may be made to the prior art, which is not limited in the present invention.

A PWM controls turning on of corresponding power switches and diodes in the first T-type three-level inverter unit and the second T-type three-level inverter unit by using pulse width modulation waves that are staggered by a phase of 180 degrees, and W levels can be output at a junction e between two coupled inductors P1 and S1 of a transformer TX1.

When the PWM turns on the power switch Q144 of the first T-type three-level inverter unit and the power switch Q148 of the second T-type three-level inverter unit, and turns off other diodes and power switches in the two T-type three-level inverter units, a current passes through the capacitor C81, the power switch Q144, the coupled inductor P1, the coupled inductor S1, the power switch Q148, and the capacitor C82 to form a loop; an electromotive force at the coupled inductor P1 is equal to an electromotive force of a positive electrode of the capacitor C81, that is, +1V, and an electromotive force at the coupled inductor S1 is equal to an electromotive force of a negative electrode of the capacitor C82, that is, −1V. Therefore, an electromotive force at the junction e between the two coupled inductors P1 and S1 is (+1+1))/2=+1V, and therefore, a level of +1V is output at the junction e between the two coupled inductors P1 and S1 of the transformer TX1.

When the power switch Q144 of the first T-type three-level inverter unit, and the diode D257 and the power switch Q151 of the second T-type three-level inverter unit are turned on, and other diodes and power switches in the two T-type three-level inverter units are turned off, a current passes through the capacitor C81, the power switch Q144, the coupled inductor P1, the coupled inductor S1, the diode D257, and the power switch Q151, and is grounded to form a loop; an electromotive force at the coupled inductor P1 is equal to an electromotive force of a positive electrode of the capacitor C81, that is, +1V, and an electromotive force at the coupled inductor S1 is equal to an electromotive force of the ground, that is, 0V. Therefore, an electromotive force at the junction e between the two coupled inductors P1 and S1 is (+1−0)/2=+1/2V, and therefore, a level of +1/2V is output at the junction e between the two coupled inductors P1 and S1 of the transformer TX1.

When the diode D255 and the power switch Q149 of the first T-type three-level inverter unit, and the diode D257 and the power switch Q151 of the second T-type three-level inverter unit are turned on, and other diodes and power switches in the two T-type three-level inverter units are turned off, the coupled inductor P1 is grounded through the diode D255 and the power switch Q149, and the coupled inductor S1 is grounded through the diode D257 and the power switch Q151; therefore, an electromotive force at the coupled inductor P1 is equal to an electromotive force of the ground, that is, 0V, and an electromotive force at the coupled inductor S1 is equal to an electromotive force of the ground, that is, 0V. Therefore, an electromotive force at the junction e between the two coupled inductors P1 and S1 is 0V, and therefore, a level of 0V is output at the junction e between the two coupled inductors P1 and S1 of the transformer TX1.

When the PWM turns on the power switch Q145 of the second T-type three-level inverter unit and the power switch Q139 of the first T-type three-level inverter unit, and turns off other diodes and power switches in the two T-type three-level inverter units, a current passes through the capacitor C81, the power switch Q145, the coupled inductor S1, the coupled inductor P1, the power switch Q139, and the capacitor C82 to form a loop; an electromotive force at the coupled inductor S1 is equal to an electromotive force of a positive electrode of the capacitor C81, that is, +1V, and an electromotive force at the coupled inductor P1 is equal to an electromotive force of a negative electrode of the capacitor C82, that is, −1V. Therefore, an electromotive force at the junction e between the two coupled inductors P1 and S1 is −(+1+1))/2=−1V, and therefore, a level of −1V is output at the junction e between the two coupled inductors P1 and S1 of the transformer TX1.

When the power switch Q145 of the second T-type three-level inverter unit and the diode D254 and the power switch Q150 of the first T-type three-level inverter unit are turned on, and other diodes and power switches in the two T-type three-level inverter units are turned off, a current passes through the capacitor C81, the power switch Q145, the coupled inductor S1, the coupled inductor P1, the diode D254, and the power switch Q150, and is grounded to form a loop; an electromotive force at the coupled inductor S1 is equal to an electromotive force of a positive electrode of the capacitor C81, that is, +1V, and an electromotive force at the coupled inductor P1 is equal to an electromotive force of the ground, that is, 0V. Therefore, an electromotive force at the junction e between the two coupled inductors P1 and S1 is −(+1−0)/2=−1/2V, and therefore, a level of −1/2V is output at an output end of the transformer TX1. Three levels may be implemented in each T-type three-level inverter unit, and therefore, 3×2−1=5 levels are implemented at the junction e between the two coupled inductors P1 and S1 of the transformer, and then by filtering by the LC filter, a sine wave is finally obtained, and is applied on a load R8.

In an actual application, the filter may be an LC filter. As shown in FIG. 5, the filter 40 specifically includes: an inductor L34 and an output filter capacitor C78, where one end of the inductor L34 is connected to the junction e between the two coupled inductors P1 and S1 of the transformer, the other end of the inductor L34 and one end of the output filter capacitor C78 are connected in series, and the other end of the output filter capacitor C78 is grounded. Meanwhile, the load R8 is added at two ends of the output filter capacitor C78.

Figure 6:
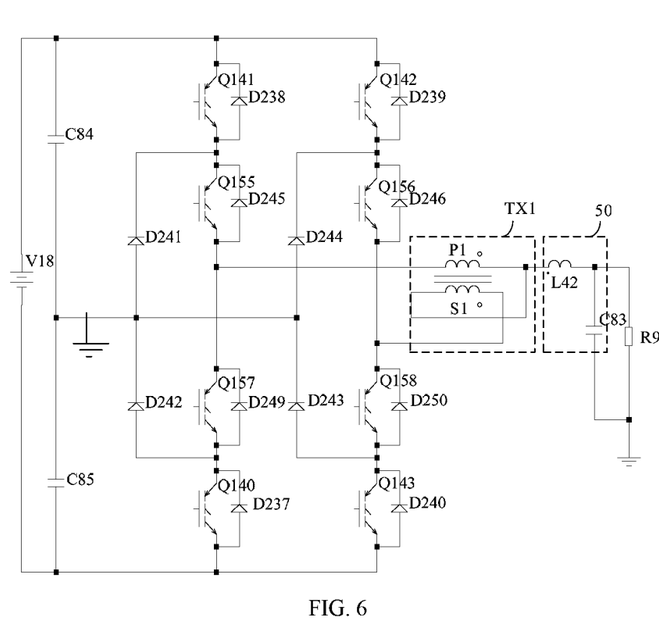
FIG. 6 is a schematic structural diagram of another five-level inverter according to an embodiment of the present invention.

When the multi-level inverter is a five-level inverter, and each of the N-level inverter units is an I-type three-level topology circuit, as shown in FIG. 6, the two N-level inverter units are a first I-type three-level inverter unit and a second I-type three-level inverter unit respectively, structures of the two N-level inverter units are the same, and devices at identical locations have identical functions. The first I-type three-level inverter unit and second I-type three-level inverter unit are configured to implement conversion from a direct current into an alternating current.

In this embodiment, it is assumed the direct current power source module is a power source V18. The first I-type three-level inverter unit includes: a power switch Q141, a diode D238, a power switch Q155, a diode D245, a power switch Q157, a diode D249, a power switch Q140, a diode D237, a diode D241, a diode D242, and a capacitor C84. The second I-type three-level inverter unit (not shown in FIG. 6) includes: a power switch Q142, a diode D239, a power switch Q156, a diode D246, a power switch Q158, a diode D250, a power switch Q143, a diode D240, a diode D244, a diode D243, and a capacitor C85.

In this embodiment, it is assumed that a voltage of the power source V18 is 2V, an electromotive force of a positive electrode of the power source V18 is +1V, and an electromotive force of a negative electrode of the power source V18 is −1V. As can be seen from FIG. 6, a positive electrode of the capacitor C84 is connected to a positive electrode of the power source V18, a negative electrode of the capacitor C85 is connected to a negative electrode of the power source V18, the capacitor C84 and the capacitor C85 are connected in series, and a junction in the middle of the capacitor C84 and the capacitor C85 is grounded. Therefore, three levels, that is, +1V, 0V, and −1V, may be separately provided for the first I-type three-level inverter unit and the second I-type three-level inverter unit.

A PWM controls turning on of corresponding power switches and diodes in the first I-type three-level inverter unit and the second I-type three-level inverter unit by using pulse width modulation waves that are staggered by a phase of 180 degrees, so that output waveforms of alternating currents generated by the first I-type three-level inverter unit and the second I-type three-level inverter unit are staggered by half a cycle, to implement output of W levels at a junction e between two coupled inductors P1 and S1 of a transformer TX1.

When the PWM turns on the power switch Q141 and the power switch Q155 of the first I-type three-level inverter unit, and the power switch Q158 and the power switch Q143 of the second I-type three-level inverter unit, and turns off other diodes and power switches in the two I-type three-level inverter units, a current passes through the capacitor C84, the power switch Q141, the power switch Q155, the coupled inductor P1, the coupled inductor S1, the power switch Q158, and the power switch Q143 to form a loop; an electromotive force at the coupled inductor P1 is equal to an electromotive force of a positive electrode of the capacitor C84, that is, +1V, and an electromotive force at the coupled inductor S1 is equal to an electromotive force of a negative electrode of the capacitor C85, that is, −1V. Therefore, an electromotive force at the junction e between the two coupled inductors P1 and S1 is (+1+1))/2=+1V, and therefore, a level of +1V is output at the junction e between the two coupled inductors P1 and S1 of the transformer TX1.

When the PWM turns on the power switch Q141 and the power switch Q155 of the first I-type three-level inverter unit, and the power switch Q158 and the diode D243 of the second I-type three-level inverter unit, and turns off other diodes and power switches in the two I-type three-level inverter units, a current passes through the capacitor C84, the power switch Q141, the power switch Q155, the coupled inductor P1, the coupled inductor S1, the power switch Q158, and the diode D243, and is grounded to form a loop, an electromotive force at the coupled inductor P1 is equal to an electromotive force of a positive electrode of the capacitor C84, that is, +1V, and an electromotive force at the coupled inductor S1 is equal to an electromotive force of the ground, that is, 0V. Therefore, an electromotive force at the junction e between the two coupled inductors P1 and S1 is (+1−0)/2=+1/2V, and therefore, a level of +1/2V is output at the junction e between the two coupled inductors P1 and S1 of the transformer TX1.

When the diode D241 and the power switch Q155 of the first I-type three-level inverter unit, and the power switch Q158 and the diode D243 of the second I-type three-level inverter unit are turned on, and other diodes and power switches in the two I-type three-level inverter units are turned off, the coupled inductor P1 is grounded through the diode D241 and the power switch Q155, and the coupled inductor S1 is grounded through the power switch Q158 and the diode D243; therefore, an electromotive force at the coupled inductor P1 is equal to an electromotive force of the ground, that is, 0V, and an electromotive force at the coupled inductor S1 is equal to an electromotive force of the ground, that is, 0V. Therefore, an electromotive force at the junction e between the two coupled inductors P1 and S1 is 0V, and therefore, a level of 0V is output at the junction e between the two coupled inductors P1 and S1 of the transformer TX1.

When the PWM turns on the power switch Q142 and the power switch Q156 of the second I-type three-level inverter unit, and the power switch Q157 and the power switch Q140 of the first I-type three-level inverter unit, and turns off other diodes and power switches in the two I-type three-level inverter units, a current passes through the capacitor C84, the power switch Q142, the power switch Q156, the coupled inductor S1, the coupled inductor P1, the power switch Q157, the power switch Q140, and the capacitor C85 to form a loop; an electromotive force at the coupled inductor S1 is equal to an electromotive force of a positive electrode of the capacitor C84, that is, +1V, and an electromotive force at the coupled inductor P1 is equal to an electromotive force of a negative electrode of the capacitor C85, that is, −1V. Therefore, an electromotive force at the junction e between the two coupled inductors P1 and S1 is −(+1+1))/2=−1V, and therefore, a level of −1V is output at the junction e between the two coupled inductors P1 and S1 of the transformer TX1.

When the power switch Q142 and the power switch Q156 of the second I-type three-level inverter unit, and the power switch Q158 and the diode D243 of the first I-type three-level inverter unit are turned on, and other diodes and power switches in the two I-type three-level inverter units are turned off, a current passes through the capacitor C84, the power switch Q142, the power switch Q156, the coupled inductor S1, the coupled inductor P1, the power switch Q158, the diode D243, and is grounded to form a loop; an electromotive force at the coupled inductor S1 is equal to an electromotive force of a positive electrode of the capacitor C84, that is, +1V, and an electromotive force at the coupled inductor P1 is equal to an electromotive force of the ground, that is, 0V. Therefore, an electromotive force at the junction e between the two coupled inductors P1 and S1 is −(+1−0)/2=−1/2V, and therefore, a level −1/2V is output at an output end of the transformer TX1. Three levels may be implemented in each three-level inverter unit, and therefore, it is implemented that 3×2−1=5 levels are output at the junction e between the two coupled inductors P1 and S1, and then by filtering by the LC filter, a sine wave is finally obtained, and is applied on a load R9.

In an actual application, the filter may be an LC filter. As shown in FIG. 6, the filter 50 specifically includes: an inductor L42 and an output filter capacitor C83, where one end of the inductor L42 is connected to the junction e between the two coupled inductors P1 and S1 of the transformer, the other end of the inductor L42 and one end of the output filter capacitor C83 are connected in series, and the other end of the output filter capacitor C83 is grounded. Meanwhile, a load R9 is added at two ends of the output filter capacitor C83.

It should be noted that, the foregoing multi-level inverters are merely examples for description. In an actual application, each N-level inverter unit in the two N-level inverter units of the multi-level inverter is a common inverter, and a specific topology structure may be used according to a specific situation. For an inversion method thereof, reference may be made to the foregoing embodiment, and details are not described in the present invention again. Particularly, the number of PWMs is not limited in the embodiment of the present invention as long as a pulse width modulation wave applied in the first N-level inverter unit and a pulse width modulation wave applied in the second N-level inverter unit are staggered by a phase of 180 degrees.

An embodiment of the present invention provides a power supply system, including a direct current power source, a load, and a multi-level inverter provided by any embodiment of the present invention, where the multi-level inverter converts a direct current generated by the direct current power source into an alternating current, so as to provide the alternating current for the load.

The multi-level inverter includes:

two N-level inverter units, where the N-level inverter unit is configured to convert a direct current into an alternating current, and pulse width modulation waves of the two N-level inverter units are staggered by a phase of 180 degrees, so that output waveforms of alternating currents generated by the two N-level inverter units are staggered by half a cycle, where N is an integer greater than or equal to 3;

a direct current power source module, configured to generate a direct current, where an output end of the direct current power source module is connected to input ends of the two N-level inverter units, and configured to supply power to the two N-level inverter units;

a transformer, where the transformer includes a primary side and a secondary side, an inductor of the primary side and an inductor of the secondary side are coupled, one end of the inductor of the primary side and one end of the inductor of the secondary side are connected to output ends of the two N-level inverter units respectively, so that the two N-level inverter units are reversely coupled, and the other end of the inductor of the primary side and the other end of the inductor of the secondary side are connected, so as to output W levels at a junction of the inductors, where W=2N−1; and a filter, where one end of the filter is connected to the junction between the two coupled inductors of the transformer, and the other end of the filter is grounded, configured to filter out a voltage ripple at the junction between the two coupled inductors of the transformer.

It may be clearly understood by a person skilled in the art that, for convenient and brief description, for specific steps involved in the system described above, reference may be made to a corresponding process in the foregoing apparatus embodiment of the multi-level inverter, which is not described herein again.

In the several embodiments provided in the present application, it should be understood that the disclosed system, apparatus, and method may be implemented in other manners For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A multi-level inverter, comprising:
two N-level inverter units, wherein each of the N-level inverter units is configured to convert a direct current into an alternating current, and pulse width modulation waves of the two N-level inverter units that are staggered by a phase of about 180 degrees, so that output waveforms of alternating currents generated by the two N-level inverter units are staggered by half a cycle, wherein N is an integer greater than or equal to 3;
a direct current power source module, configured to generate the direct current, wherein an output end of the direct current power source module is connected to input ends of the two N-level inverter units, and configured to supply power to the two N-level inverter units;
a transformer, comprising a primary side and a secondary side, wherein an inductor of the primary side and an inductor of the secondary side are coupled, one end of the inductor of the primary side and one end of the inductor of the secondary side are connected to output ends of the two N-level inverter units respectively, so that the two N-level inverter units are reversely coupled, and the other end of the inductor of the primary side and the other end of the inductor of the secondary side are connected, so as to output W levels at a junction between the inductor of the primary side and the inductor of the secondary side, wherein W=2N−1; and
a filter, configured to filter out a voltage ripple at the junction between the two coupled inductors of the transformer, wherein one end of the filter is connected to the junction between the two coupled inductors of the transformer, and the other end of the filter is grounded.

2. The multi-level inverter according to claim 1, wherein
the two N-level inverter units comprise a first N-level inverter unit and a second N-level inverter unit; and
at least one switching device in the first N-level inverter unit and at least one switching device in the second N-level inverter unit are turned on, so that when the first N-level inverter unit, the second N-level inverter unit, the direct current power source module, and the transformer form a loop, the W levels are output at the junction between the inductor of the primary side and the inductor of the secondary side.

3. The multi-level inverter according to claim 2, wherein the switching device is a diode or a power switch.

4. The multi-level inverter according to claim 1, wherein structures of the two N-level inverter units are the same.

5. The multi-level inverter according to claim 1, wherein the N-level inverter unit is a T-type five-level topology circuit.

6. The multi-level inverter according to claim 1, wherein the N-level inverter unit is an I-type five-level topology circuit.

7. The multi-level inverter according to claim 1, wherein the N-level inverter unit is a T-type three-level topology circuit.

8. The multi-level inverter according to claim 1, wherein the N-level inverter unit is an I-type three-level topology circuit.

9. The multi-level inverter according to claim 1, wherein the filter comprises a filter inductor and an output filter capacitor, wherein one end of the filter inductor is connected to the junction between the inductor of the primary side of the transformer and the inductor of the secondary side of the transformer, the other end of the filter inductor and one end of the output filter capacitor are connected in series, and the other end of the output filter capacitor is grounded.

10. A power supply system, comprising a direct current power source, a load and a multi-level inverter, wherein the multi-level inverter converts a direct current generated by the direct current power source into an alternating current, so as to provide the alternating current for the load;
wherein the multi-level inverter comprises:
two N-level inverter units, wherein each of the N-level inverter units is configured to convert a direct current into an alternating current, and pulse width modulation waves of the two N-level inverter units that are staggered by a phase of 180 degrees, so that output waveforms of alternating currents generated by the two N-level inverter units are staggered by half a cycle, wherein N is an integer greater than or equal to 3;
a direct current power source module, configured to generate the direct current, wherein an output end of the direct current power source module is connected to input ends of the two N-level inverter units, and configured to supply power to the two N-level inverter units;
a transformer, comprising a primary side and a secondary side, wherein an inductor of the primary side and an inductor of the secondary side are coupled, one end of the inductor of the primary side and one end of the inductor of the secondary side are connected to output ends of the two N-level inverter units respectively, so that the two N-level inverter units are reversely coupled, and the other end of the inductor of the primary side and the other end of the inductor of the secondary side are connected, so as to output W levels at a junction between the inductor of the primary side and the inductor of the secondary side, wherein W=2N−1; and
a filter, configured to filter out a voltage ripple at the junction between the two coupled inductors of the transformer, wherein one end of the filter is connected to the junction between the two coupled inductors of the transformer, and the other end of the filter is grounded.

11. The power supply system according to claim 10, wherein
the two N-level inverter units comprise a first N-level inverter unit and a second N-level inverter unit; and
at least one switching device in the first N-level inverter unit and at least one switching device in the second N-level inverter unit are turned on, so that when the first N-level inverter unit, the second N-level inverter unit, the direct current power source module, and the transformer form a loop, the W levels are output at the junction between the inductor of the primary side and the inductor of the secondary side.

12. The power supply system according to claim 11, wherein the switching device is a diode or a power switch.

13. The power supply system according to claim 10, wherein structures of the two N-level inverter units are the same.

14. The power supply system according to claim 10, wherein the N-level inverter unit is a T-type five-level topology circuit.

15. The power supply system according to claim 10, wherein the N-level inverter unit is an I-type five-level topology circuit.

16. The power supply system according to claim 10, wherein the N-level inverter unit is a T-type three-level topology circuit.

17. The power supply system according to claim 10, wherein the N-level inverter unit is an I-type three-level topology circuit.

18. The power supply system according to claim 10, wherein the filter comprises a filter inductor and an output filter capacitor, wherein one end of the filter inductor is connected to the junction between the inductor of the primary side of the transformer and the inductor of the secondary side of the transformer, the other end of the filter inductor and one end of the output filter capacitor are connected in series, and the other end of the output filter capacitor is grounded.

\* \* \* \* \*